(12) United States Patent
McHale et al.

(10) Patent No.: US 12,234,644 B2
(45) Date of Patent: Feb. 25, 2025

(54) DEPLOYABLE CURVED LATTICE STRUCTURES

(71) Applicant: UNIVERSITY OF LIMERICK, Limerick (IE)

(72) Inventors: Ciarán McHale, Limerick (IE); Paul Weaver, Limerick (IE); Robert Telford, Limerick (IE)

(73) Assignee: UNIVERSITY OF LIMERICK, Limerick (IE)

( * ) Notice: Subject to any disclaimer, the term of this patent is extended or adjusted under 35 U.S.C. 154(b) by 358 days.

(21) Appl. No.: 17/753,029

(22) PCT Filed: Aug. 24, 2020

(86) PCT No.: PCT/EP2020/073609
§ 371 (c)(1),
(2) Date: Feb. 15, 2022

(87) PCT Pub. No.: WO2021/037787
PCT Pub. Date: Mar. 4, 2021

(65) Prior Publication Data
US 2022/0333381 A1    Oct. 20, 2022

(30) Foreign Application Priority Data

Aug. 29, 2019  (GB) .................................. 1912419

(51) Int. Cl.
*B64G 1/22*      (2006.01)
*E04B 1/19*      (2006.01)
(Continued)

(52) U.S. Cl.
CPC .............. *E04C 3/005* (2013.01); *B64G 1/222* (2013.01); *E04B 1/19* (2013.01); *E04B 1/343* (2013.01)

(58) Field of Classification Search
CPC . B64G 1/44; B64G 1/22; B64G 1/222; B64G 1/2221; E04C 3/005; E04H 12/182;
(Continued)

(56) References Cited

U.S. PATENT DOCUMENTS 3,836,979 A * 9/1974 Kurland ............... H01Q 11/086
343/895
3,913,109 A * 10/1975 Owen .................... H01Q 1/362
52/110

(Continued)

FOREIGN PATENT DOCUMENTS

CN         101915346 A      12/2010
EP         0666612 A2 *      2/1995
(Continued)

OTHER PUBLICATIONS

Gina Olson, Sergio Pellegrino, Joseph Costantine and Jeremy Banik. "Structural Architectures for a Deployable Wideband UHF Antenna," AIAA 2012-1836. 53rd AIAA/ASME/ASCE/AHS/ASC Structures, Structural Dynamics and Materials Conference. Apr. 2012. (Year: 2012).*

(Continued)

*Primary Examiner* — Richard Green
*Assistant Examiner* — Michael A. Fabula
(74) *Attorney, Agent, or Firm* — Hoffman Warnick LLC

(57) ABSTRACT

Deployable structures, methods and apparatus for deployment of deployable structures, and associated manufacturing methods. Such deployable structures suitably comprise components for space structures, such supports for solar arrays, antennas or other similar systems. The deployable structure comprises a lattice element arrangeable in a stowed configuration and a deployed configuration. The lattice element comprises a pre-stressed strip arranged in a clockwise helix, a pre-stressed strip arranged in an anticlockwise helix, and (Continued)

a plurality of fasteners for rotatably coupling the strips to one another at a plurality of positions distributed along the length of the strips. The fasteners are provided at unequal spacings along the length of the strips such that on deployment the lattice element bends to a curved deployed configuration.

14 Claims, 14 Drawing Sheets

(51) Int. Cl.
*E04B 1/343* (2006.01)
*E04C 3/00* (2006.01)

(58) Field of Classification Search
CPC ...... H01Q 1/10; H01Q 1/1235; H01Q 11/086; E04B 1/19; E04B 1/34357
See application file for complete search history.

(56) References Cited

U.S. PATENT DOCUMENTS

| | | | | |
|---|---|---|---|---|
| 4,068,238 | A * | 1/1978 | Acker | H01Q 11/086 343/895 |
| 4,253,284 | A | 3/1981 | Bliss et al. | |
| 4,475,111 | A * | 10/1984 | Gittinger | H01Q 11/086 343/915 |
| 4,587,777 | A * | 5/1986 | Vasques | B64G 99/00 52/645 |
| 4,725,025 | A * | 2/1988 | Binge | H01Q 1/08 244/172.6 |
| 4,918,884 | A * | 4/1990 | Okazaki | E04H 12/185 52/646 |
| 5,003,736 | A * | 4/1991 | Okazaki | E04H 12/185 52/646 |
| 5,721,558 | A * | 2/1998 | Holemans | H01Q 11/086 343/895 |
| 5,909,197 | A * | 6/1999 | Heinemann | H01Q 1/288 343/895 |
| 5,986,619 | A | 11/1999 | Grybos et al. | |
| 6,345,482 | B1 * | 2/2002 | Warren | B64G 99/00 52/646 |
| 7,694,486 | B2 * | 4/2010 | Murphy | E04C 3/005 52/645 |
| 8,381,460 | B1 | 2/2013 | McDermott | |
| 8,730,124 | B2 * | 5/2014 | Behrens | B64G 1/222 343/895 |
| 9,371,662 | B1 | 6/2016 | Pereira et al. | |
| 9,611,056 | B1 | 4/2017 | Spence et al. | |
| 9,742,058 | B1 * | 8/2017 | O'Neill, Jr. | H01Q 1/08 |
| 10,119,266 | B1 * | 11/2018 | Jeon | B64G 1/222 |
| 11,608,632 | B2 * | 3/2023 | Smith | E04C 2/20 |
| 12,017,805 | B2 * | 6/2024 | Mchale | B64G 1/222 |
| 2002/0124518 | A1 * | 9/2002 | Warren | B64G 1/2224 52/646 |
| 2005/0115186 | A1 | 6/2005 | Jensen et al. | |
| 2005/0126106 | A1 * | 6/2005 | Murphy | H01Q 1/08 52/652.1 |
| 2010/0319270 | A1 * | 12/2010 | Slade | B64G 1/222 52/71 |
| 2011/0185647 | A1 | 8/2011 | Diniz et al. | |
| 2014/0174016 | A1 | 6/2014 | Diniz et al. | |
| 2014/0232611 | A1 * | 8/2014 | Ochoa | H01Q 11/086 343/881 |
| 2014/0318040 | A1 | 10/2014 | Edwards et al. | |
| 2015/0372374 | A1 * | 12/2015 | Judd | H01Q 1/084 244/172.6 |
| 2018/0111703 | A1 | 4/2018 | Hensley et al. | |
| 2018/0135794 | A1 | 5/2018 | Ghazanfari et al. | |
| 2022/0289406 | A1 * | 9/2022 | Mchale | B64G 1/2226 |

FOREIGN PATENT DOCUMENTS

| | | | |
|---|---|---|---|
| EP | 1593597 A1 | 11/2005 | |
| JP | H0379498 A | 4/1991 | |
| JP | H0439441 U | 4/1992 | |
| WO | WO-2021037785 A1 * | 3/2021 | B64G 1/222 |
| WO | WO-2021037786 A1 * | 3/2021 | B64G 1/222 |

OTHER PUBLICATIONS

Costantine, Joseph et al. "UHF Deployable Helical Antennas for CubeSats." IEEE Transactions on Antennas and Propagation 64 (2016): 3752-3759. (Year: 2016).*

M. Sakovsky, S. Pellegrino and J. Costantine, "Rapid Design of Deployable Antennas for CubeSats: A tool to help designers compare and select antenna topologies," in IEEE Antennas and Propagation Magazine, vol. 59, No. 2, pp. 50-58, Apr. 2017, doi: 10.1109/MAP.2017.2655531. (Year: 2017).*

Gina Olson, Sergio Pellegrino, Jeremy Banik and Joseph Costantine. "Deployable helical antennas for cubesats," AIAA 2013-1671. 54th AIAA/ASME/ASCE/AHS/ASC Structures, Structural Dynamics, and Materials Conference. Apr. 2013. (Year: 2013).*

Escrig, F. & Pérez-Valcárcel, Juan. (1993). Geometry of Expandable Space Structures. International Journal of Space Structures. 8. 71-84. 10.1177/0266351193008001-208. (Year: 1993).*

PCT International Search Report and Written Opinion for International Application No. PCT/EP2020/073609, dated Nov. 13, 2020, 14 pages.

Great Britain Search Report for Application No. GB1912419.7, dated Feb. 28, 2020, 4 pages.

* cited by examiner

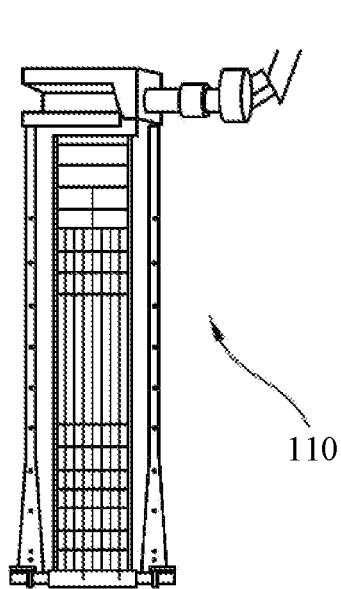
--Prior Art--
Figure 1a
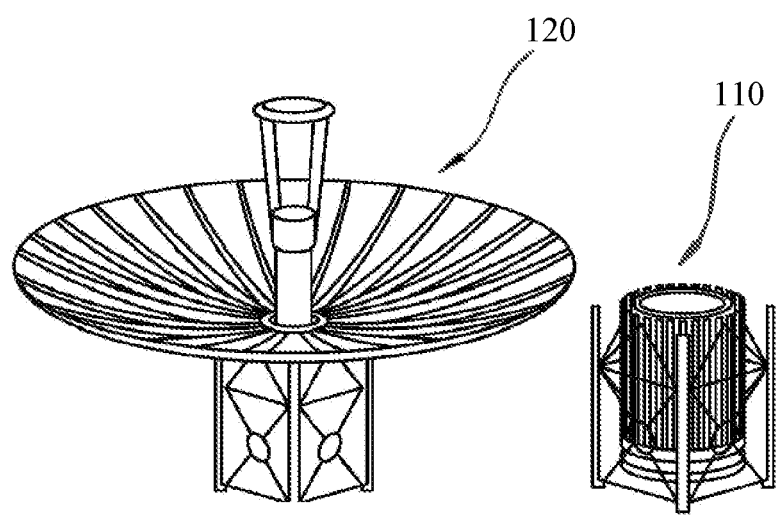
--Prior Art--
Figure 1b
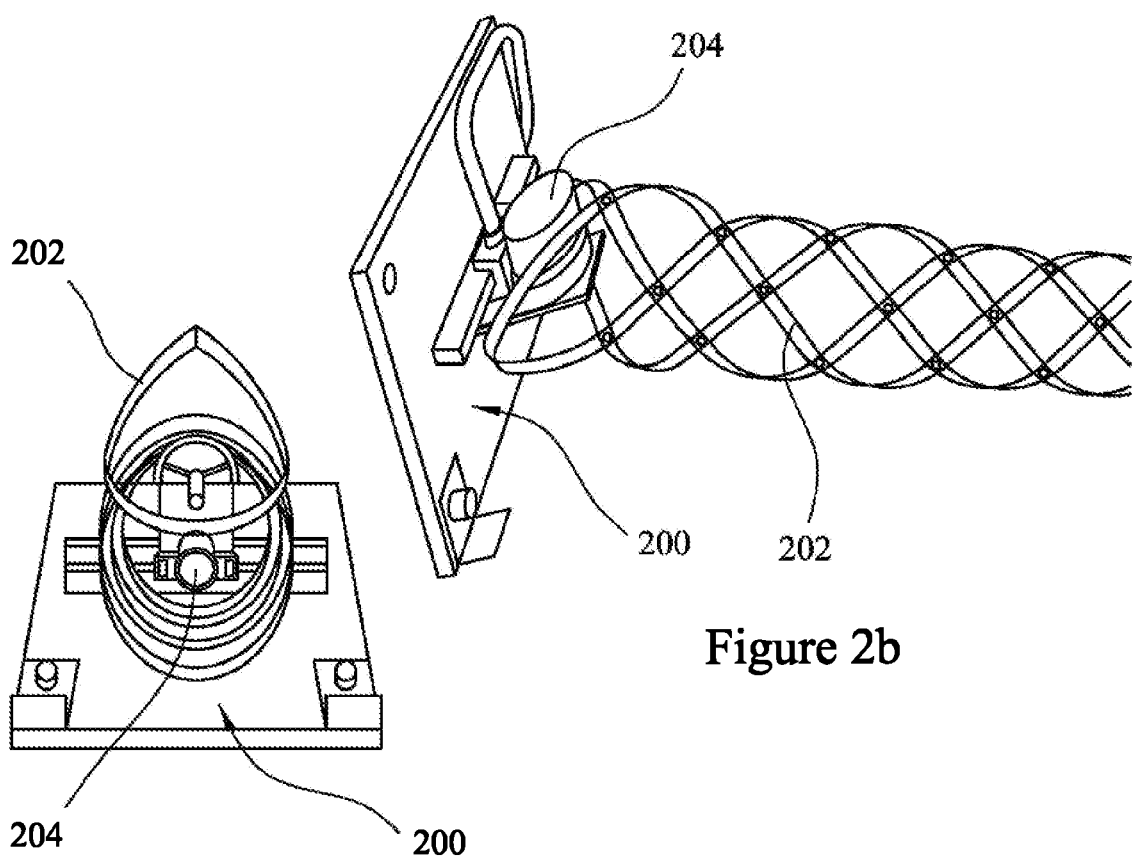
Figure 2a
Figure 2b

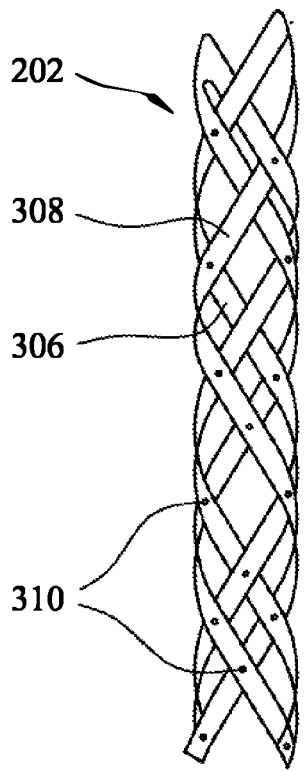
Figure 3a
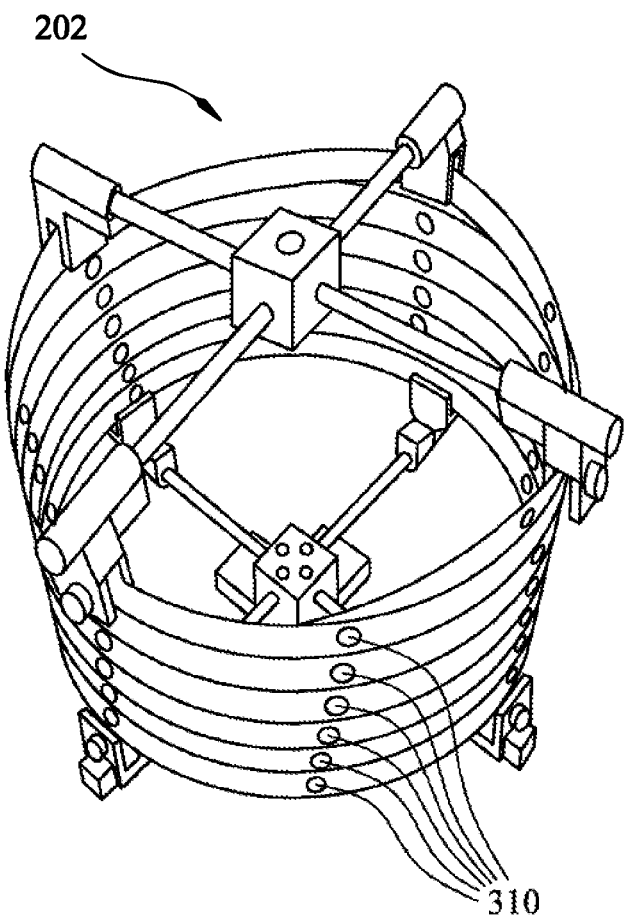
Figure 3b
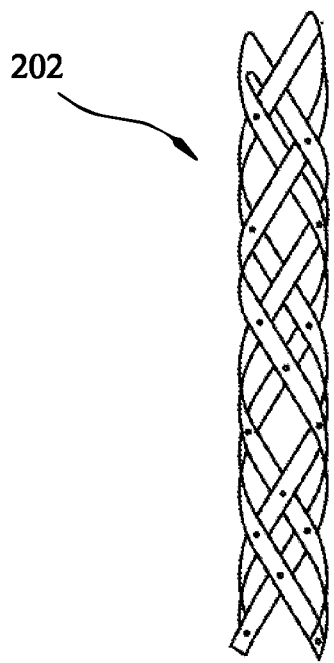 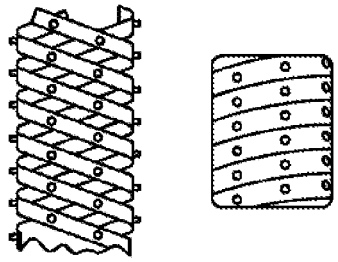
Figure 3c

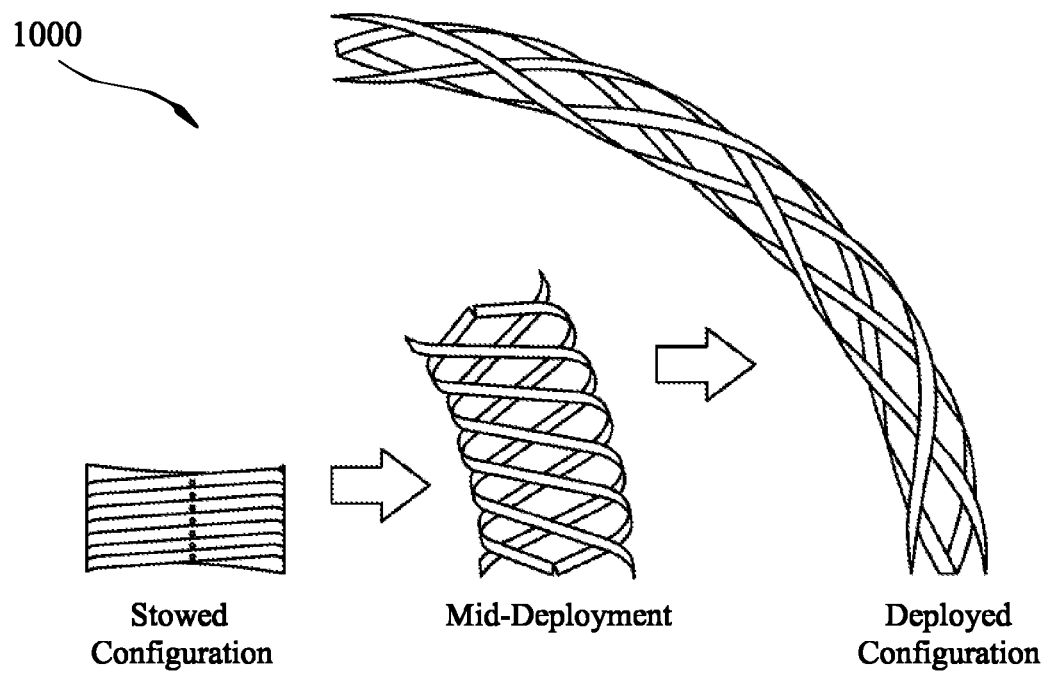
Figure 10
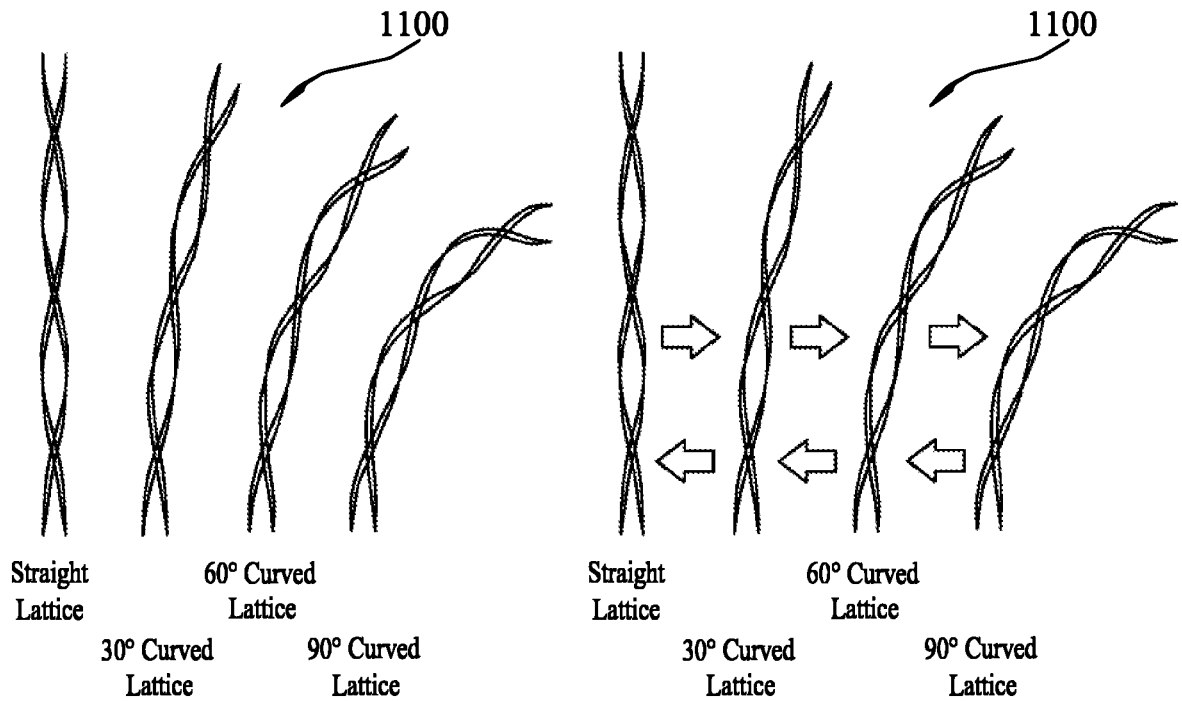
Figure 11aFigure 11b

DEPLOYABLE CURVED LATTICE STRUCTURES

TECHNICAL FIELD

The present disclosure relates to deployable structures, to methods and apparatus for deployment of deployable structures, and to associated manufacturing methods. Such deployable structures suitably comprise components for space structures, such supports for solar arrays, antennas or other similar systems.

BACKGROUND

The volumetric capacity of the launch vehicle is a major constraint on the design of a spacecraft, and consequentially every system onboard the launch vehicle needs to be as space efficient as possible. This includes solar arrays 110 and antennas 120 as shown in FIGS. 1*a* and 1*b*, which are typically packaged with a deployment structure to stow in a compact package but also reliably deploy to a great length. The weight of the launch vehicle is another critical design parameter because of the thrust power needed during launch. NASA estimates that it currently costs approximately 10,000 US dollars to launch a mass of one Imperial pound (453.59237 grams) into low earth orbit.

Thus, when considering the design of deployable structures for space, as well as structural stiffness the packaging ratio and mass are important. The packaging ratio determines the relative length change of the structure, from the stowed to the deployed configuration. The mass of the structure is important due to high launch costs, and sufficient stiffness is required to resist load on the structure from an AOCS (attitude & orbit control system) of the associated orbiter. In addition, deployment of the structure must be reliable and controlled, to prevent damage to attached components.

Deployable space structures generally use Collapsible Tube Masts (CTM) and the Storable Tubular Extendable Members (STEM). These are tube structures that can be flattened and rolled for storage and can also deploy to great lengths. However, CTM and STEM usually require relatively large mechanisms to control the speed and direction of deployment. Scaling-up known deployable space structures and achieving suitable geometry in the deployed configuration also present engineering challenges.

Example embodiments consistent with this disclosure provide deployable structures which perform well in some or all of the above-mentioned design aspects, and address the above-mentioned or related shortcomings and other problems in this field.

SUMMARY

We describe an apparatus and method as set forth in the appended claims. Other features of the invention will be apparent from the dependent claims, and the description which follows.

In one aspect, there is provided a deployable structure comprising a lattice element and a deployment mechanism, the lattice element arrangeable in a stowed configuration and a deployed configuration, wherein deployment from the stowed configuration to the deployed configuration takes place using stored energy of bending in the lattice element, and wherein the deployment mechanism comprises a tension element to regulate deployment.

In one example, the deployment mechanism is arranged substantially within the lattice element when the lattice element is arranged in the stowed configuration.

In one example, the tension element is arranged to regulate extension of the lattice element in an axial direction, during deployment from the stowed configuration to the deployed configuration.

In one example, the deployment mechanism comprises a tension controller coupled to the tension element, the tension controller arranged to provide a controlled tension on the tension element during deployment from the stowed configuration to the deployed configuration.

In one example, the deployment mechanism comprises a tension controller that is arranged to produce variable tension on the tension element over the course of deployment from the stowed configuration to the deployed configuration.

In one example, the deployment mechanism comprises a tension controller that is arranged to produce reducing tension on the tension element over the course of deployment from the stowed configuration to the deployed configuration.

In one example, the deployment mechanism comprises a tension controller that is actively driven to control the tension on the tension element over the course of deployment from the stowed configuration to the deployed configuration.

In one example, the deployment mechanism comprises a tension controller in the form of a motor.

In one example, the tension element comprises a substantially inextensible, flexible member.

In one example, the deployment mechanism comprises a tension element arranged around a spool when the lattice element is arranged in the stowed configuration, wherein unwinding of the tension element from the spool under control of a tension controller regulates the deployment from the stowed configuration to the deployed configuration.

In one example, the deployment mechanism comprises one or more attachments coupling the deployment mechanism to the lattice, the attachments arranged to support the lattice and hold it in fixed orientation relative to the deployment mechanism.

In one example, the deployment mechanism comprises one or more attachments that couple the deployment mechanism to the lattice, the attachments arranged to move radially inwards over the course of deployment from the stowed configuration to the deployed configuration.

In one example, the attachments comprise a pivoting connection at the lattice and a sliding connection to a support for the deployment mechanism.

In one example, the deployment mechanism comprises a lock, for example a magnetic lock, arranged to restrict outward radial movement of the lattice once on reaching the deployed configuration.

In one aspect, there is provided a method of deployment of a deployable structure that comprises a lattice element arrangeable in a stowed configuration and a deployed configuration, and a deployment mechanism, the method comprising regulating deployment of the lattice that takes place using stored energy of bending in the lattice element using a tension element of the deployment mechanism.

In one aspect, there is provided a deployable structure comprising: a first lattice arrangeable in a stowed configuration and a deployed configuration; and a second lattice arrangeable in a stowed configuration and a deployed configuration, wherein with the lattices arranged in the stowed configuration the second lattice nests in the first lattice.

In one example, the first lattice and the second lattice are generally cylindrical in the stowed configuration, with the radius of the second lattice smaller than that of the first lattice.

In one example, in the stowed configuration the length of the second lattice is less than or equal to the length of the first lattice.

In one example, the first lattice and second lattice are axially aligned with one another and are arranged to deploy in series.

In one example, the first lattice and second lattice are connected end to end.

In one example, deployment takes place using stored energy of bending in the lattice elements.

In one example, the deployable structure comprises a deployment mechanism, arranged to regulate deployment of the first and second lattices using of a tension element.

In one example, the deployment mechanism comprises a tension controller that is arranged to control the tension on the tension element over the course of deployment from the stowed configuration to the deployed configuration to thereby regulate deployment of the first and second lattices.

In one example, the deployment mechanism comprises a tension element arranged around a spool when the lattice elements are arranged in the stowed configuration, wherein unwinding of the tension element from the spool under control of a tension controller regulates deployment from the stowed configuration to the deployed configuration.

In one example, the tension element is arranged internally of the first and second lattice elements.

In one example, the deployment mechanism nests in the first and second lattices.

In one example, the deployable structure comprises one or more attachments that couple the first and second lattices to one another, the attachments arranged to move radially inwards over the course of deployment from the stowed configuration to the deployed configuration.

In one example, the deployable structure comprising a third, fourth or higher numbered lattice, such that the lattices are nested in the first lattice.

In one example, the third, fourth or higher numbered lattice is related to the respective adjacent lattice or lattices as the first and second lattices are to one another.

In one aspect, there is provided a method of deployment of a deployable structure that comprises a first lattice and a second lattice, the method comprising: nesting the second lattice in the first lattice in a stowed configuration; and deploying the deployable structure by deploying the first and second lattices from their stowed configurations.

In one aspect, there is provided a deployable structure comprising a lattice element arrangeable in a stowed configuration and a deployed configuration, the lattice element comprising: a pre-stressed strip arranged in a clockwise helix; a pre-stressed strip arranged in an anticlockwise helix; and a plurality of fasteners for rotatably coupling the strips to one another at a plurality of positions distributed along the length of the strips; characterised in that the fasteners are provided at unequal spacings along the length of the strips such that on deployment the lattice element bends to a curved deployed configuration.

In one example, the fasteners are provided at unequal spacings along a part of the length of the strips such that on deployment the lattice element bends to a curved deployed configuration along a part of the length thereof, and are further provided at equal spacings along a part of the length of the strips such that on deployment the lattice element bends to a rectilinear deployed configuration along a part of the length thereof.

In one example, the fasteners are provided at generally decreasing spacings along a part of the length of the strips such that on deployment the lattice element bends to a curved deployed configuration along a part of the length thereof with a decreasing radius of curvature.

In one example, the fasteners are provided at generally increasing spacings along a part of the length of the strips such that on deployment the lattice element bends to a curved deployed configuration along a part of the length thereof with an increasing radius of curvature.

In one example, the lattice element comprises a plurality of pre-stressed strips arranged in a clockwise direction and a plurality of pre-stressed strips arranged in an anticlockwise helix.

In one example, the strips comprise a plurality of holes that align with one another and at which the fasteners are provided, passing through holes in the strips and holding the strips adjacent to one another.

In one example, the pre-stressed strips are pre-stressed by bending from a large radius on manufacture to a smaller radius when incorporated into the lattice element.

In one example, the pre-stressed strips comprise a fibre reinforced polymer material.

In one example, the first element is generally cylindrical in the stowed configuration.

In one example, deployment takes place using stored energy of bending in the pre-stressed strips.

In one example, the deployable structure comprises a deployment mechanism, arranged to regulate deployment of the first and second lattices using of a tension element.

In one example, the deployment mechanism comprises a tension controller that is arranged to control the tension on the tension element over the course of deployment from the stowed configuration to the deployed configuration to thereby regulate deployment of the lattice element.

In one example, the deployable structure comprising a second lattice element connected in series with the first lattice element.

In one example, the deployable structure comprising a solar array or antenna coupled to the lattice element(s).

In one aspect, there is provided a method of manufacturing a lattice for a deployable structure as set out in any one of the above-mentioned examples, the method comprising: determining required lattice characteristics; forming strips for the lattice; and assembling the strips into the lattice.

According to the present invention there is provided an apparatus and method as set forth in the appended claims. Other features of the invention will be apparent from the drawings, and the description which follows.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 1a shows a roll-out solar array, according to the state of the art, in a deployed configuration;

FIG. 1b shows a Ka-band parabolic deployable antenna, according to the state of the art, on the left in a deployed configuration and on the right in a stowed configuration prior to deployment;

FIGS. 2a and 2b show a deployable structure in stowed and deployed configurations respectively;

FIG. 3a shows a lattice for a deployable structure, arranged in a deployed configuration;

FIG. 3b shows the lattice of FIG. 3a held in a stowed configuration;

FIG. 3c shows the lattice of FIG. 3a in deployed configuration, the stowed configuration and an intermediate configuration;

FIG. 10 shows an example of a deployable structure with variable curvature in a stowed configuration, mid-deployment configuration and deployed configuration;

FIG. 11a shows a deployable structure with variable curvature;

FIG. 11b shows another example of a deployable structure with variable curvature;

DETAILED DESCRIPTION OF EXAMPLE EMBODIMENTS

Figure 4:
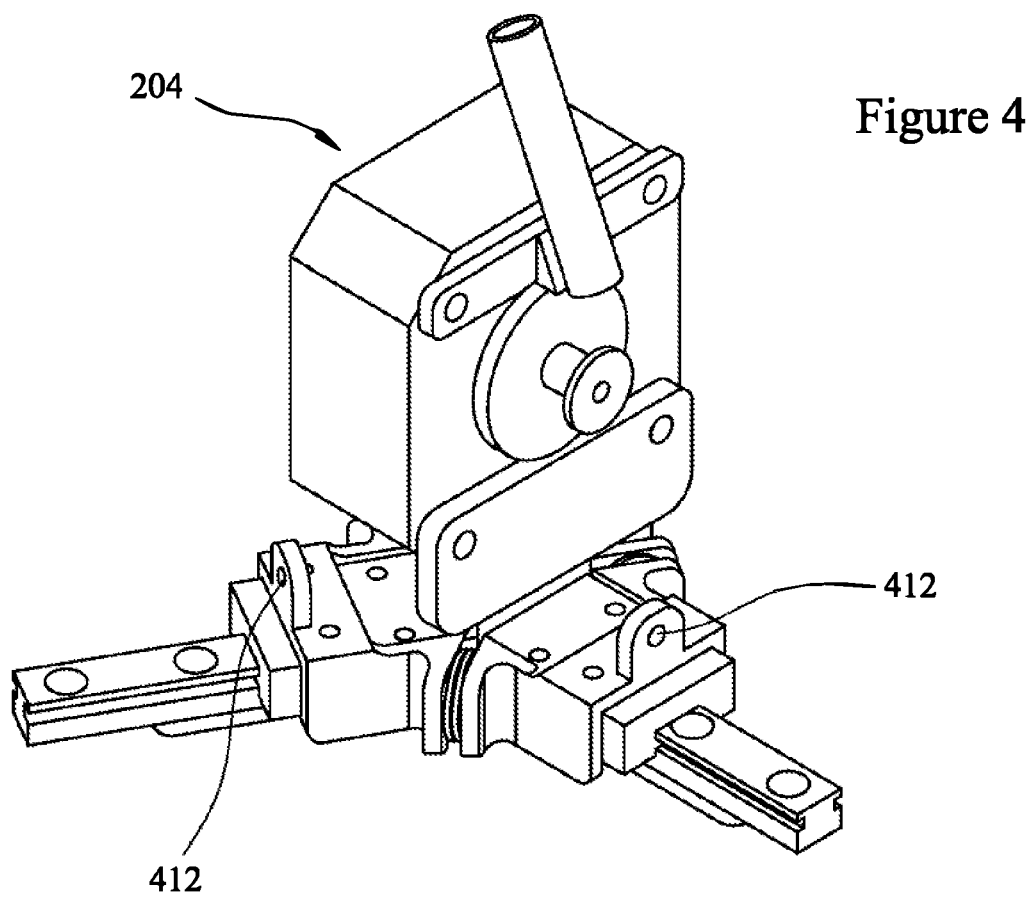
FIG. 4 shows a deployment mechanism for use with a deployable structure.

FIGS. 2a and 2b show a deployable structure 200. The deployable structure 200 is suitable for use in deployment of a space structure and subsequently supporting itself and the space structure. FIG. 2a shows the deployable structure 200 in a stowed configuration and FIG. 2b shows the deployable structure 200 in a deployed configuration. The deployable structure 200 comprises a deployable element 202, in this example in the form of a lattice, and a deployment mechanism 204. In both the stowed and deployed configurations, the lattice 202 is generally cylindrical, being characterised by a length and a radius. FIGS. 2a and 2b show how the lattice changes in length and radius on deployment, with an increase in length relative to a datum at an end of the lattice 202 and relative decrease in radius from the stowed configuration to the deployed configuration.

This deployment apparatus 200 performs well in key design aspects of deployable space structures such as size, packaging ratio, mass and bending stiffness when in the deployed configuration. The deployment apparatus 200 operates with high reliability and offers good deployment control, thus reducing the likelihood of damage to attached components. The operation of the deployable structure 200, and features that contribute to its utility are described in more detail below.

FIGS. 3a and 3b show a lattice 202 corresponding to the deployable element of the deployment apparatus 200. FIG. 3a shows the lattice 202 in a deployed configuration and FIG. 3b shows the lattice 202 in a stowed configuration. In FIG. 3b part of a deployment mechanism 400 is also shown, as described in more detail below. The lattice 202 comprises eight pre-stressed strips 306, 308. Half of the strips are arranged in a clockwise helix and the other half of the strips are arranged in an anticlockwise helix. This assembly prevents the strips from uncoiling and enables a stable shape to be lattice shape to be formed. The skilled person will appreciate that more than eight or less than eight strips may be used. The strips 306, 308 comprise holes, which are equally distanced from each other along the length of the strips 306, 308. Fasteners 310, in this example in the form of rivets, are inserted into the holes, joining the strips 306, 308 to one another at pivoting connections, thereby forming the lattice 202. It will be appreciated that other similar fastening means such as bolts, pins, screws etc may be used to join the strips 306, 308. The strips 306, 308 are made of carbon fibre reinforced plastic material, and have high bending stiffness and low weight. The lattice 202 is configured to use stored energy of bending in the strips during the transition from stowed configuration to deployed configuration. In this way, self-deployment action can be achieved, and energy sources such as batteries need not be carried to drive the deployment of the lattice. As the strips in the lattice deform during deployment, by virtue of their deformation and relative movement, the lattice 202 changes in length and radius simultaneously.

As will be appreciated from FIG. 3c, the lattice 202 in this example has three stability points. The fully stowed configuration is stable, the fully deployed configuration is stable, and there is a stability point in between these two. Different points of stability may exist at other points of partial deployment. Through the manipulation of the manufacturing parameters, the lattice 202 can be configured to be stable from at one or more other positions between the stowed configuration and the deployed configuration. In particular, the bending stiffness of the strips around their three principal axes, the degree of pre-stress/pre-bending applied to the strips, the number and separation of the holes in the strips are relevant.

In this way, the deployment apparatus 200 is adaptable to most deployable space applications such as solar arrays or antennas.

FIG. 4 shows a stepper motor 204 which acts as the deployment mechanism 204. The motor 204 cooperates with sliders 412 that attach to the lattice. The lattice 202 is attached, at its far end, to the motor 204 by a tension element, in this example a cable. The sliders 412 are small and serve to anchor the lattice 202 to the deployment mechanism in a way that accounts for the reduction in radius of the lattice 202 as the lattice moves from the stowed configuration to the deployed configuration. Bearings or any other similar component may be used instead of the sliders 412. The motor 204 is also small, and in use fits inside the lattice 202. As a result, the stowed volume is not increased by the stepper motor 204. The stepper motor 204 is configured to regulate deployment speed of the lattice 202, by resisting extension of the lattice 202 by tension in the tension element. The motor 204 releases the tension element by controlled unwinding, resisting the elastic extension of the lattice 202, thereby allowing the deployable structure to change from the stowed configuration to the deployed configuration in a regulated manner. This is advantageous because a quick release of the lattice 202 could create a shock wave that might potentially damage components attached thereto. Thus, the deployment of the lattice 202 is simple and reliable. Magnets may be used to lock the lattice 202 in the deployed configuration.

In example embodiments where a deployment mechanism as described is used to control the deployment of a deployable structure including a lattice 202, there may be unused empty volume inside of the lattice when arranged in the stowed configuration. That is, with typical stepper motors of generally cubic geometry, there may additional space within the deployable structure in the stowed configuration, either radially to the side or around the deployment mechanism, or axially adjacent to or along from the deployment mechanism.

Figure 5:
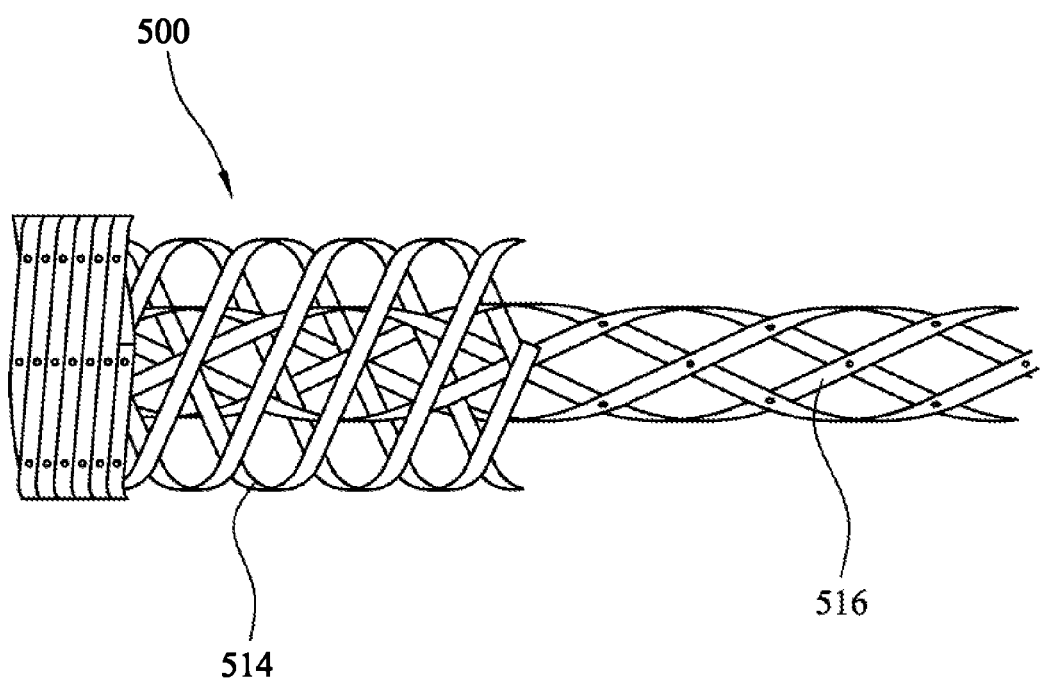
FIG. 5 shows another example of a deployable structure.

FIG. 5 shows another example of a deployable structure 500. The deployable structure 500 comprises a first lattice 514 and a second lattice 516. To achieve higher packaging ratios, the first and the second lattices 514, 516 can operate together to deploy to a greater length than would be easily achieved with a single larger lattice.

The first lattice and the second lattice 514, 516 may have the same properties as the above-described lattices of FIG. 2 or 3. The first lattice and the second lattice 514, 516, are axially aligned with one another. The first lattice and second lattice 514, 516 are operable to deploy in series. The first lattice and second lattice 514, 516 are connected together end to end. The second lattice 516 has a smaller radius than the first lattice 514. Thus, it is possible to nest the second lattice 516 inside the first lattice 514 when the deployable structure is in the stowed configuration. In this way, the deployed length may be significantly increased while maintaining the same stowed volume. A deployment mechanism (e.g. a stepper motor as described above) may be mounted inside the lattices and operate to regulate the deployment of the lattices in the deployable structure.

Figure 6A:
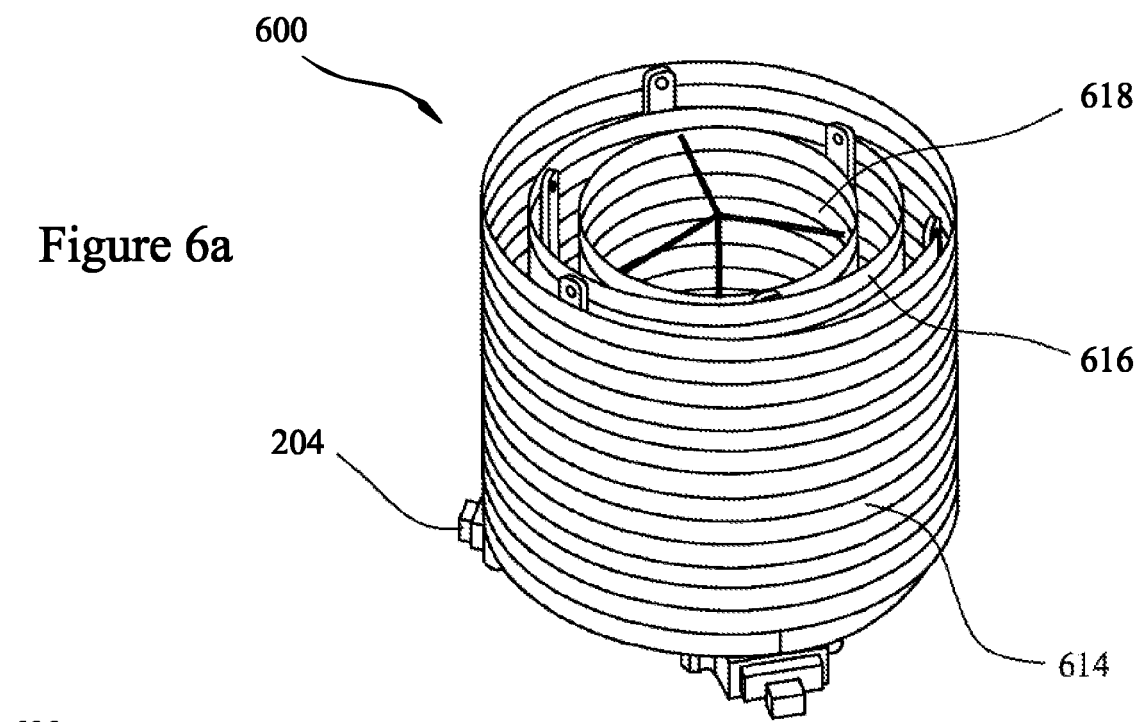
FIG. 6a shows another example of a deployable structure in a stowed configuration.
Figure 6B:
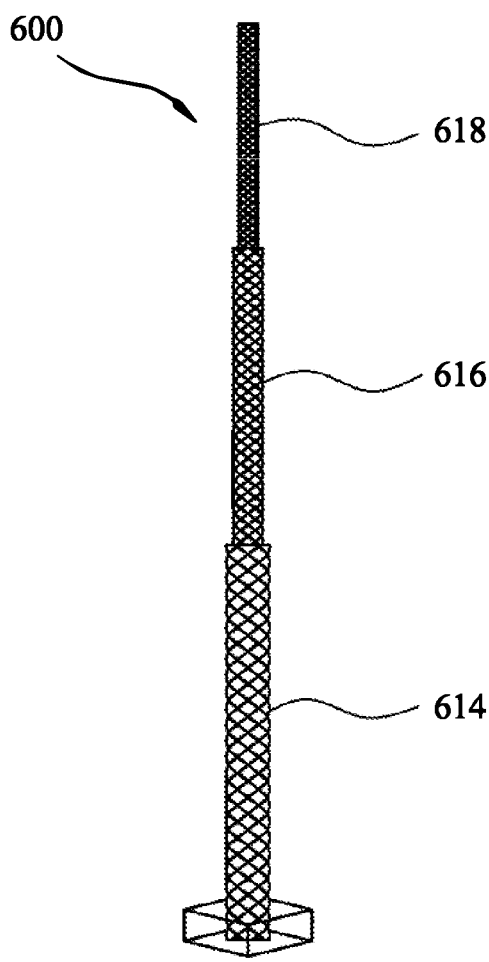
FIG. 6b shows the deployable structure of FIG. 6a in a deployed configuration.

FIG. 6 shows another example of a deployable structure 600. The deployable structure 600 comprises a first lattice 614, a second lattice 616 and a third lattice 618. To achieve higher packaging ratios, the first, second and third lattices 614, 616, 618 can operate together to deploy to a greater length than would be easily achieved with a single larger lattice.

The first lattice, second lattice and third lattice 614, 616, 618 may have the same properties as the above-described lattices of FIG. 2 or 3. The first lattice, second lattice and third lattice 614, 616, 618 are axially aligned with one another. The first lattice, second lattice and third lattice 614, 616, 618 are operable to deploy in series. The first lattice, second lattice and third lattice 614, 616, 618 are connected together end to end. The second lattice 616 has a smaller radius than the first lattice 614, with the third lattice 618 having a smaller radius than the second lattice 616. Thus, it is possible to nest the second lattice 616 inside the first lattice 614 when the deployable structure is in the stowed configuration, and further to nest the third lattice 618 in the second lattice 616. In this way, the deployed length may be significantly increased while maintaining the same stowed volume. A deployment mechanism (e.g. a stepper motor as described above) may be mounted inside the lattices and operate to regulate the deployment of the lattices in the deployable structure.

In one example, rigid steel joints connect the first lattice 614 and the second lattice 616 in end to end arrangement, and correspondingly connect the second lattice 616 and the third lattice 618. The second lattice 616 has a smaller radius by 10 mm than the first lattice 614 in the stowed configuration. The third lattice 618 has a smaller radius by 10 mm than the second lattice 616 when in the stowed configuration.

To regulate deployment of the deployable structure 600, a deployment mechanism is provided is attached to the top of the inner lattice (i.e. the third lattice 618). In the example of FIG. 6, the deployment mechanism comprises a stepper motor and a spool of cable. The stepper motor is still small enough to be placed inside the lattices. In this way, a multi-stage deployment can be regulated by a single deployment mechanism.

Although the example embodiment of FIG. 6 comprises three lattices, two lattices only may be nested in alternative embodiments, and likewise, four or more lattices may be nested in still further embodiments.

The skilled person will appreciate that increasing the stiffness of the strips in the lattice will produce a smoother deployment. The bending stiffness of the deployable structure, when deployed, is increased by increasing the number of strips in the lattice to three, four or more. Use of three, four or more strips in the lattice helps to hold the lattice in the deployed configuration, resisting bending.

In the example shown in FIG. 6, each lattice 614, 616, 618 has six strips. The deployment mechanism provides a sufficient amount of force to regulate deployment of the deployable structure but is still small enough to fit inside the lattices 614, 616, 618. The stowed height of the deployable structure of FIGS. 5 and 6 is 100 mm and the deployed height is 3m which gives the packaging ratio of 30.

Figure 7:
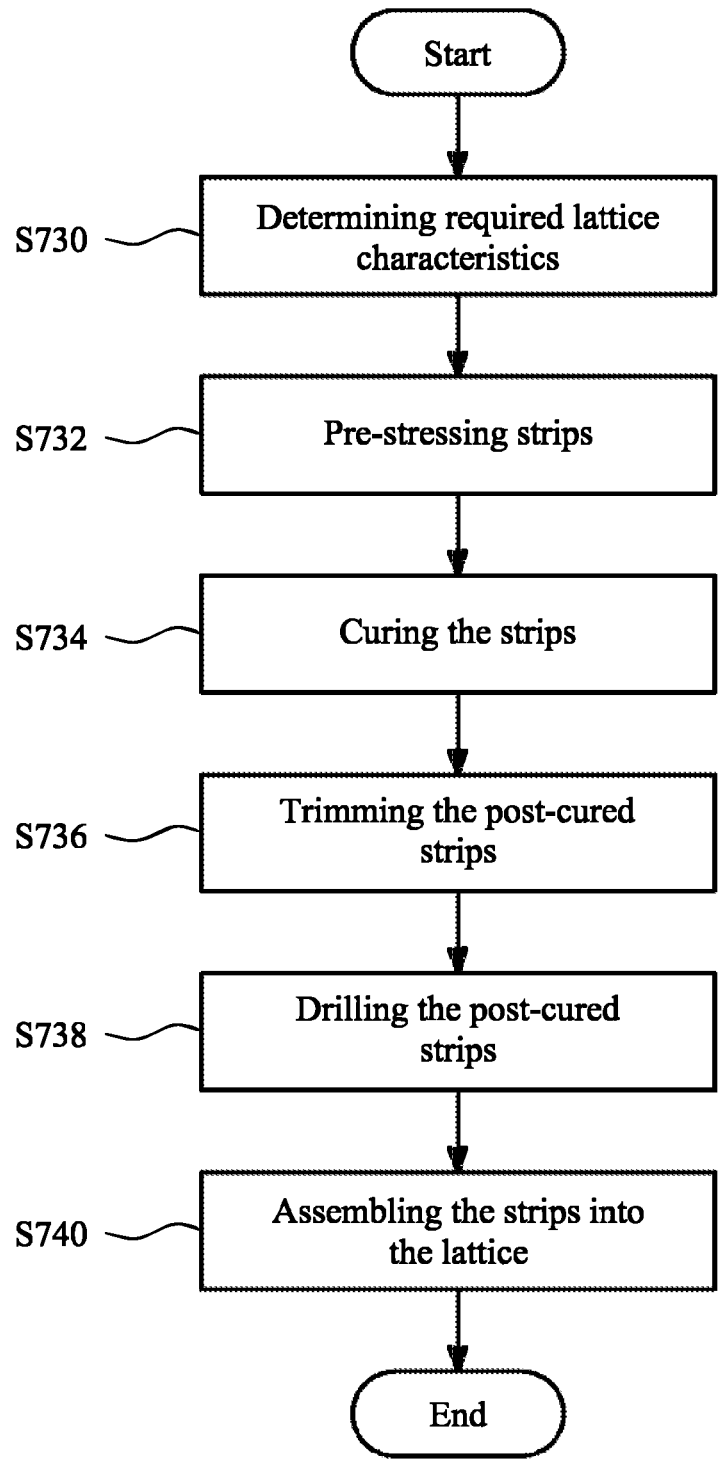
FIG. 7 shows a method of manufacturing of a deployable structure.

FIG. 7 shows a method of manufacturing of a lattice. The manufactured lattice can be used in any of the deployable structures described herein. The method relates to manufacture from components that comprise a composite material, for example a fibre reinforced plastic material such as CFRP.

At step S730, the method comprises determining required lattice characteristics. At steps S732 to S738 strips are formed, and then assembled to form a lattice at step S740. FIG. 7 shows example sub-steps of the method for forming the strips for assembly, which starts with step S732 of forming pre-stressing material strips. At step S734, the method comprises curing the strips. At step S736, the method comprises a step of finishing the post-cured strips, for example including trimming. At step S738, the method comprises forming holes in the post-cured strips to enable the strips to be joined to one another, for example by drilling. At step S740, the method comprises assembling the strips into the lattice, coupling the strips to one another.

Referring to step S730, the method comprises determining required lattice characteristics. A mathematical model has been developed that discussed relevant design parameters, published as A. Pirrera, X. Lachenal, S. Daynes, P. M. Weaver and I. V. Chenchiah, in "*Multi-stable cylindrical lattices,*" *Journal of the Mechanics and Physics of Solids*, pp. 2087-2107, 2013. Once the lattice characteristics have been decided, based on its application, manufacturing can begin.

Figure 8:
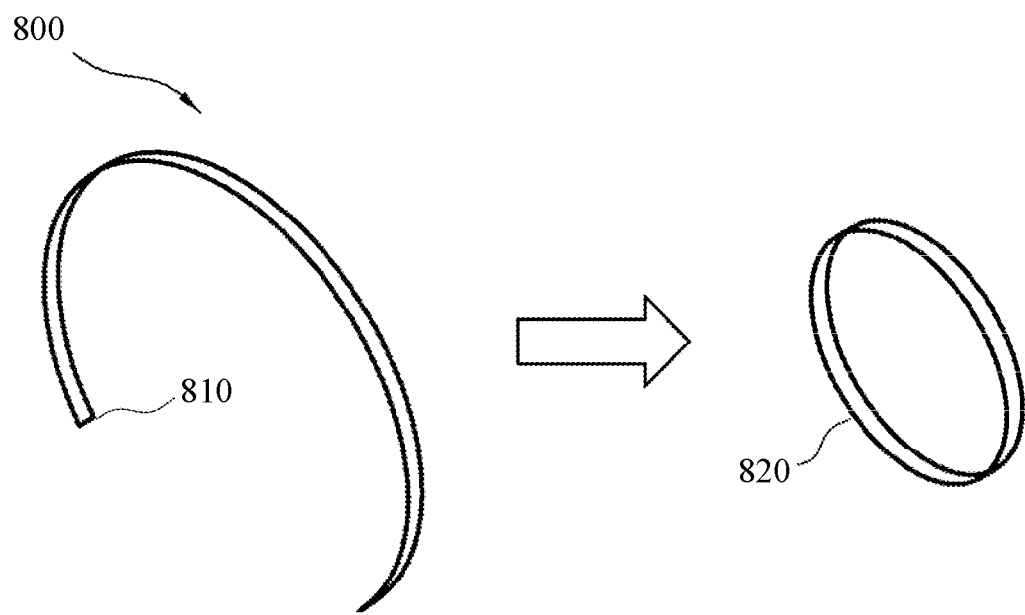
FIG. 8 shows the application of pre-stress through the change in radius from manufactured shape to being a part of a deployable structure.

At step in S732, the method comprises a step of pre-stressing strips. FIG. 8 shows a finite element model 800 which shows the application of pre-stress through the change in radius from manufactured shape 810 to being part of a lattice 820. Pre-stressing of the strips in the lattice is achieved by laying up the strips on a curved mould with a radius larger than that of the desired lattice. The increase in the radius of the mould results in the increased pre-stress on the strips.

At step S734, the method comprises a step of curing the strips. The strips are cured in the autoclave. For example, the strips may be cured at 180 degrees Celsius and 7 bar pressure. For example, the strips may be made of fibre reinforced polymer material.

At steps S736 and S738, the post-cured strips are trimmed, and holes formed in the strips to allow the strips to be joined to one another. The holes are drilled at equal distances from each other in lattices which are to deploy in a rectilinear manner.

Finally, the strips may be assembled into the lattice at step S740. Half of the plurality of pre-stressed strips is arranged in a clockwise helix and the other half of the plurality of pre-stressed strips is arranged in an anticlockwise helix. This assembly resists uncoiling and improves the overall stability of the structure. Fasteners are used to couple the pre-stressed strips in the lattice.

The holes which are formed in the strips, either by the particular step of drilling post-cured strips, or by other methods, may be arranged at unequal distances from each other. This allows the lattice formed of the strips to be deployed in a non-linear manner.

The fasteners may be provided at unequal spacings along the length of the strips such that on deployment the lattice element bends to a curved deployed configuration. The fasteners may be provided at unequal spacings along a part of the length of the strips such that on deployment the lattice element bends to a curved deployed configuration along a part of the length thereof, and further provided at equal spacings along a part of the length of the strips such that on deployment the lattice element bends to a rectilinear deployed configuration along a part of the length thereof.

The fasteners may be provided at generally decreasing spacings along a part of the length of the strips such that on deployment the lattice element bends to a curved deployed configuration along a part of the length thereof with a decreasing radius of curvature. Alternatively, the fasteners may be provided at generally increasing spacings along a part of the length of the strips such that on deployment the lattice element bends to a curved deployed configuration along a part of the length thereof with an increasing radius of curvature.

Referring to step S730, the method comprises determining required lattice characteristics. The analytical model developed for the related deployable structures which deploys in a straight line can be used to estimate the location of the stable points and the general characteristics of the deployable structure with variable curvature. The determination of the characteristics of a deployable structure with variable curvature is described in more detail in relation to FIG. 9.

An important aspect of a deployable structure with a variable curvature is its radius of curvature. The radius of curvature, and corresponding curve is controlled by two factors. The first factor is the spacing of the connections between the strips that form the lattice (i.e. the spacing of the holes). The second factor that determines the curve of the lattice is its stable position considering the amount of pre-stress in the strips and their bending characteristics generally.

Figures 9A, 9B, 9C:
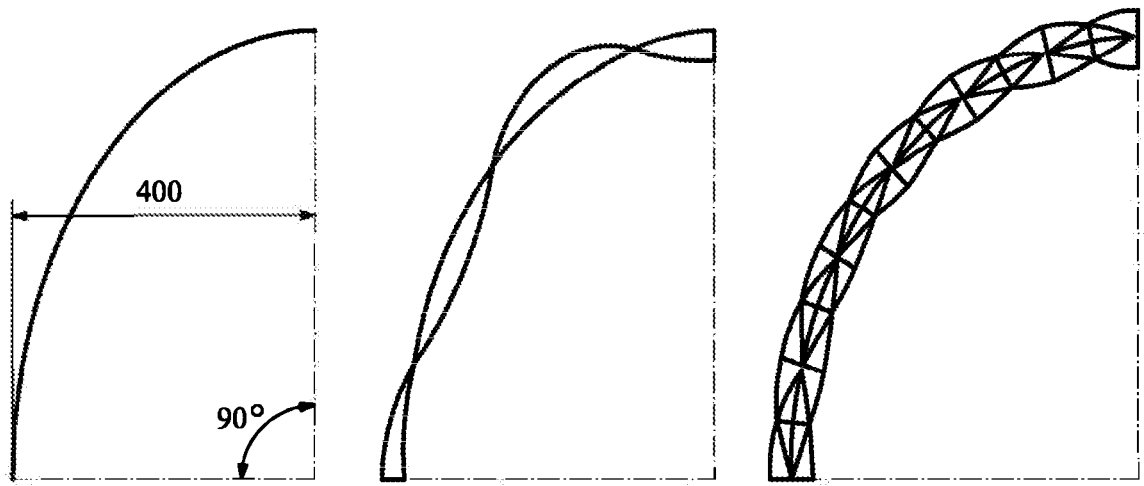
FIGS. 9a-9g show steps in determining lattice characteristics for a deployable structure with variable curvature.

It is desirable to have the spacing of the connections on the inside of the curve closer together than the ones on the outside. This spacing may be determined, for example, through computer-aided design (CAD) modelling. The curve and length of the lattice are determined simply by a line as shown in FIG. 9a. The radius of curvature of the lattice is then controlled by a horizontal line that is connected to the bottom of this curve. In order to create the helical shape of the lattice, a surface sweep of this horizontal line is created along the first curve. Here, the number of revolutions the strips have in the lattice is decided.

FIG. 9b shows a single sweep lattice with 1.5 revolutions. This process is repeated three more times, sweeping different lines at different angles to the original curved line. This produces four clockwise strips of the lattice. This process may be repeated more than three times or less than three times. The process is repeated by sweeping the lines in the anticlockwise direction to create all eight strips of the lattice. This is shown in FIG. 9c.

Figures 9D, 9E:
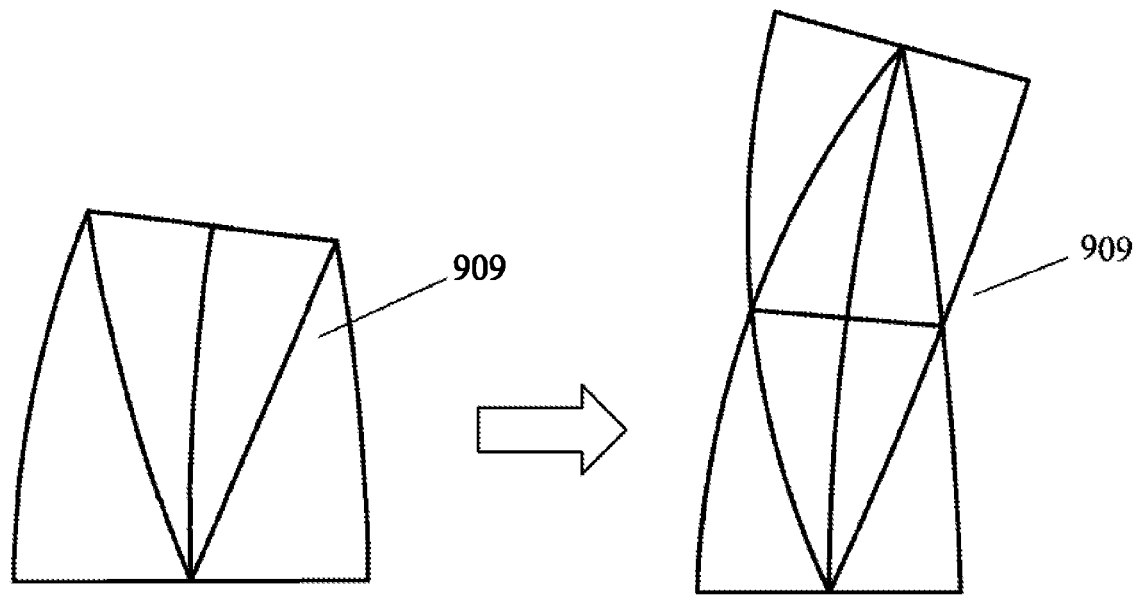

As will be appreciated, according to design requirements more or less than eight strips may be made. The locations of the connections of the lattices are located where the sweeps of the lines cross paths. The spacings on the strips increase as the helix moves from the inside of the curve to the outside and vice versa. In order to accurately measure these spacings, the lattice is reduced in size and revolutions, to the location of the first connection, as shown in FIG. 9d. Then the length 909 of each of the line sweeps is recorded. Next, the lattice is increased in length and revolutions to the next connection. This is shown in FIG. 9e. Lengths 909 are recorded and the process is repeated. The recorded lengths 909 may be, for example, one or more lengths of the arc(s). After one full helix revolution, the spacings in each of the strips repeat.

Figure 9F:
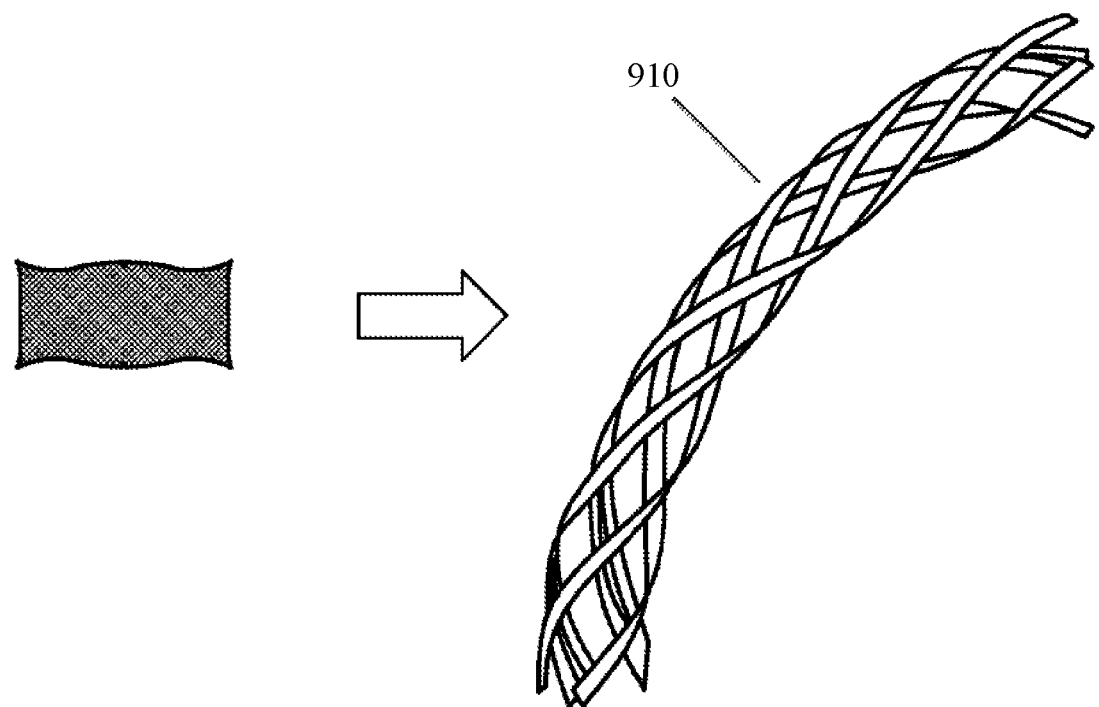

As above, the second factor that is relevant to determining the curve of the lattice is its stable position. As the curved lattice deploys, the curve of the structure increases. Therefore, a lattice that only deploys a little can only have a relatively slight curve, and a lattice that can deploy to greater lengths can curve relatively more. The stable position can be determined by mathematically modelling the strain energy to accurately predict the stability positions. This may be achieved by, for example, finite element modelling. An example of a finite element model 910 is shown in FIG. 9f.

Figure 9G:
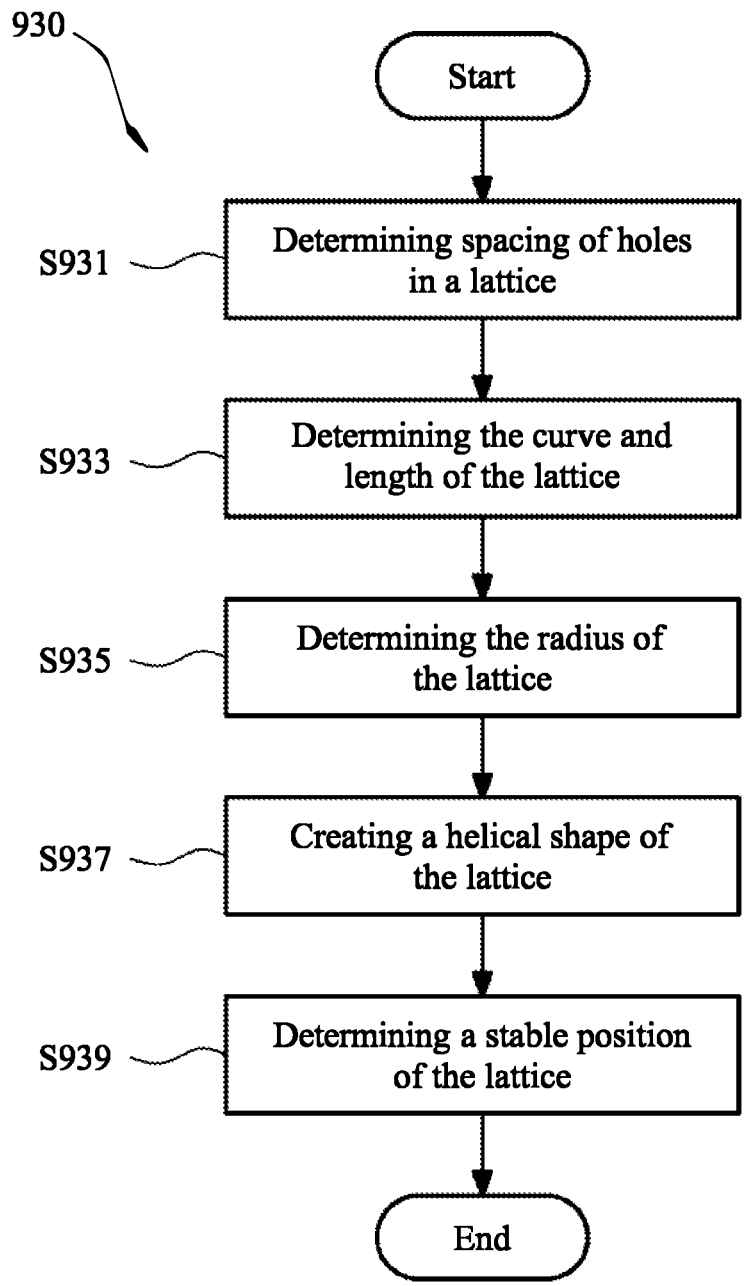

FIG. 9g shows a method 930 of determining required lattice characteristics for a deployable structure with variable curvature. As stated above, the curve and stable points of the lattice. The method 930 comprises a step of determining spacing of holes in a lattice S931. The method 930 further comprises a step of determining the curve and length of the lattice S933. The method 930 further comprises a step of determining the radius of the lattice S935. The method 930 further comprises a step of creating a helical shape of the lattice S937. The method 930 furthers comprise a step of determining a stable position of the lattice S939. The method 930 of FIG. 9g may be used at step S730 in FIG. 7 to manufacture a deployable structure with variable curvature.

FIG. 10 shows an example of a deployable structure 1000 with variable curvature in a stowed configuration, mid-deployment configuration and deployed configuration. The difference between the deployable structure 1000 and the above-described deployable structures of the present disclosure is that the fasteners of the deployable structure 1000 may be provided at unequal spacings along the length of the strips such that on deployment the deployable structure 1000 bends to a curved deployed configuration. Other properties of the deployable structure 1000 may be the same as the properties of the above-described lattices of FIGS. 2, 3, 5 and 6. The deployable structure 1000 may also be connected with other deployable structures 1000 in series as described in relation to FIG. 6. The deployable structure 1000 may also be deployed in a manner as described herein, such as by the above-described stepper motor.

FIG. 11a shows a deployable structure with a variable curvature 1100. FIG. 11b shows another example of a deployable structure with variable curvature 1100. The deployable structure 1100 may be the same as the deployable structure 1000 described above. FIG. 11 highlight that the curved lattice 1100 may go from straight-line deployment to 90 degrees curvature and back. The curvature may also exceed 90 degrees.

Figure 12:
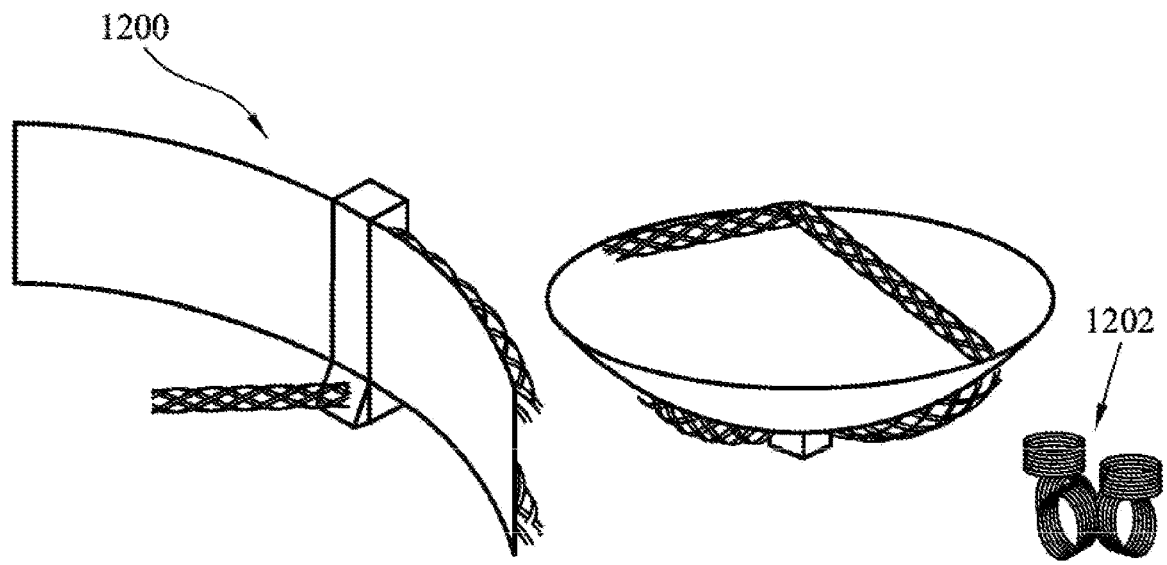
FIG. 12 shows a roll-out solar array in a deployed and stowed configuration.

FIG. 12 shows a roll-out solar array in a deployed configuration 1200 and in a stowed configuration 1202. This configuration 1200, 1202 uses four curved lattices as the structural members of the reflector and two straight lattices to hold the feed antenna. The design May use more or less than four curved lattices and more or less than two straight lattices.

Multiple lattices can be used in series to produce the dish shape of an antenna. When paired with lattice nesting, the size of this antenna can be increased while maintaining a small stowed size. In the stowed state 1202, the curved lattice still has a cylindrical shape which is ideal for nesting. The rigidity of the lattice can be controlled through its composite lay-up allowing it to be tailored to different types of antennae. The deployable structure with variable curvature can be also combined in series with the deployable structure which deploys in a straight line. Thus, any shape of deployment may be achieved. The deployable structure with variable curvature can be referred to as "curved lattice" and the deployable structure which deploys in a straight line can be referred to as "straight lattice".

Figure 13A:
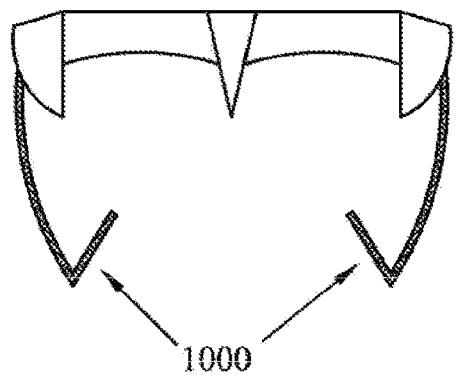
FIG. 13a shows an application of a deployable structure with a variable curvature.
Figure 13B:
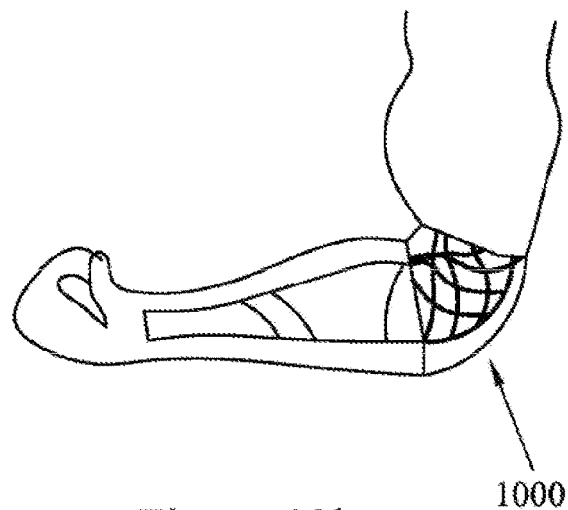
FIG. 13b shows another application of a deployable structure with a variable curvature.
Figure 13C:
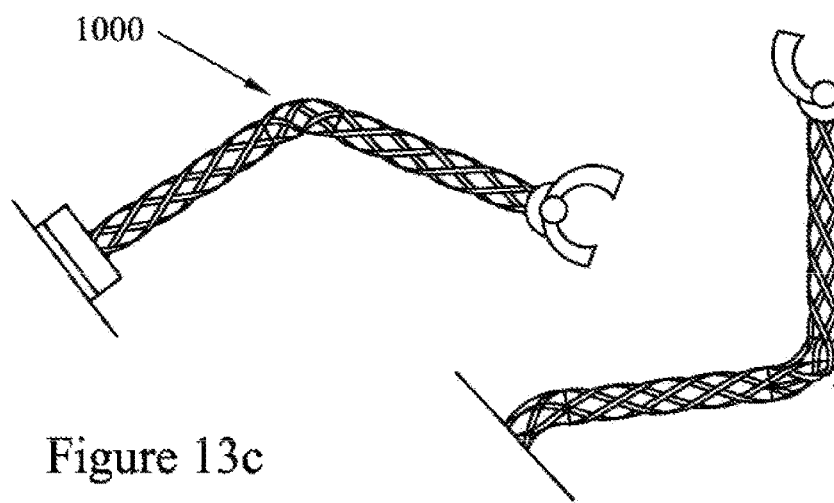
FIG. 13c shows yet another application of a deployable structure with variable curvature.
Figure 14:
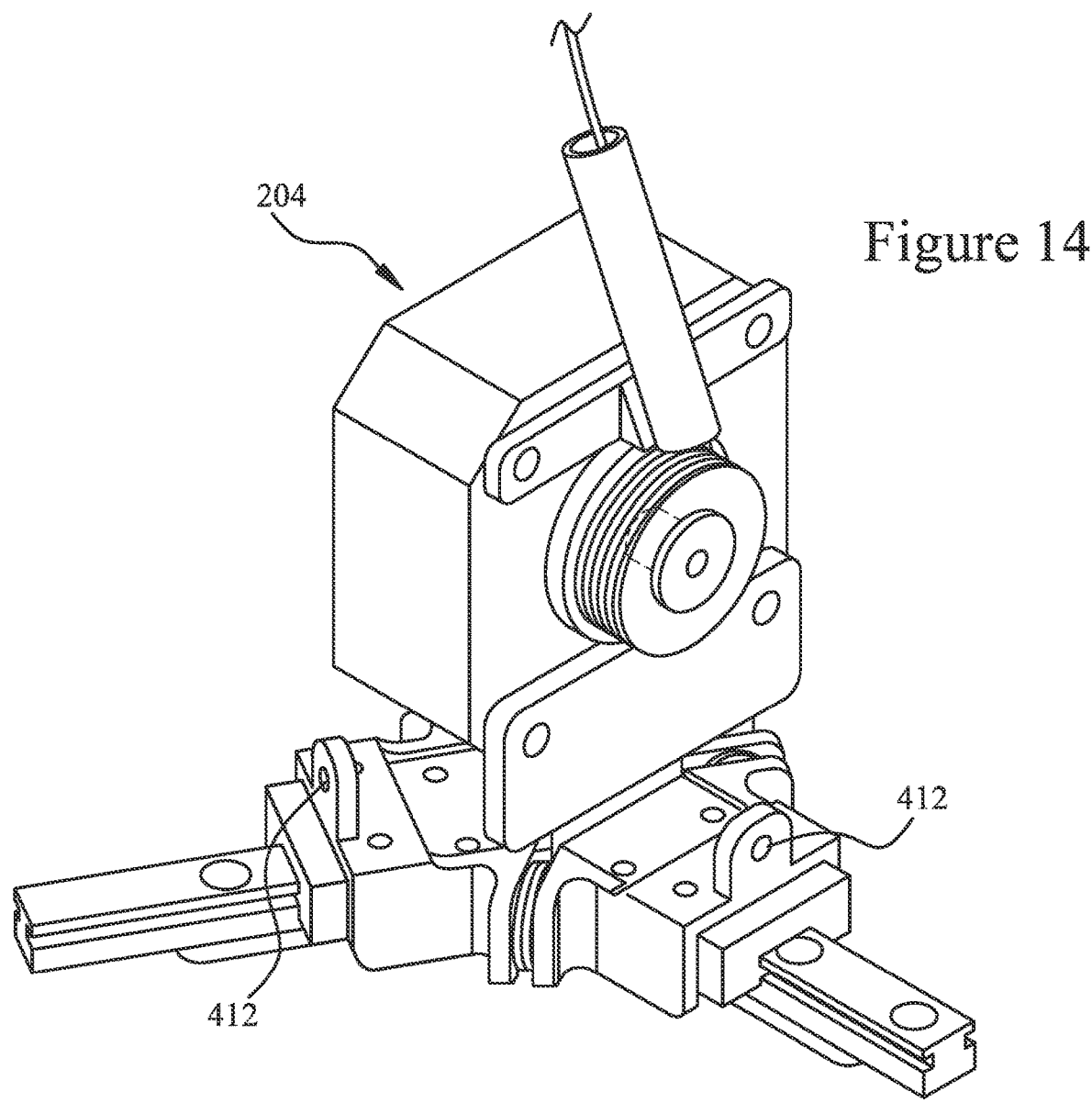
FIG. 14 shows an isolated view of the deployment mechanism including a tension element.
Figure 15:
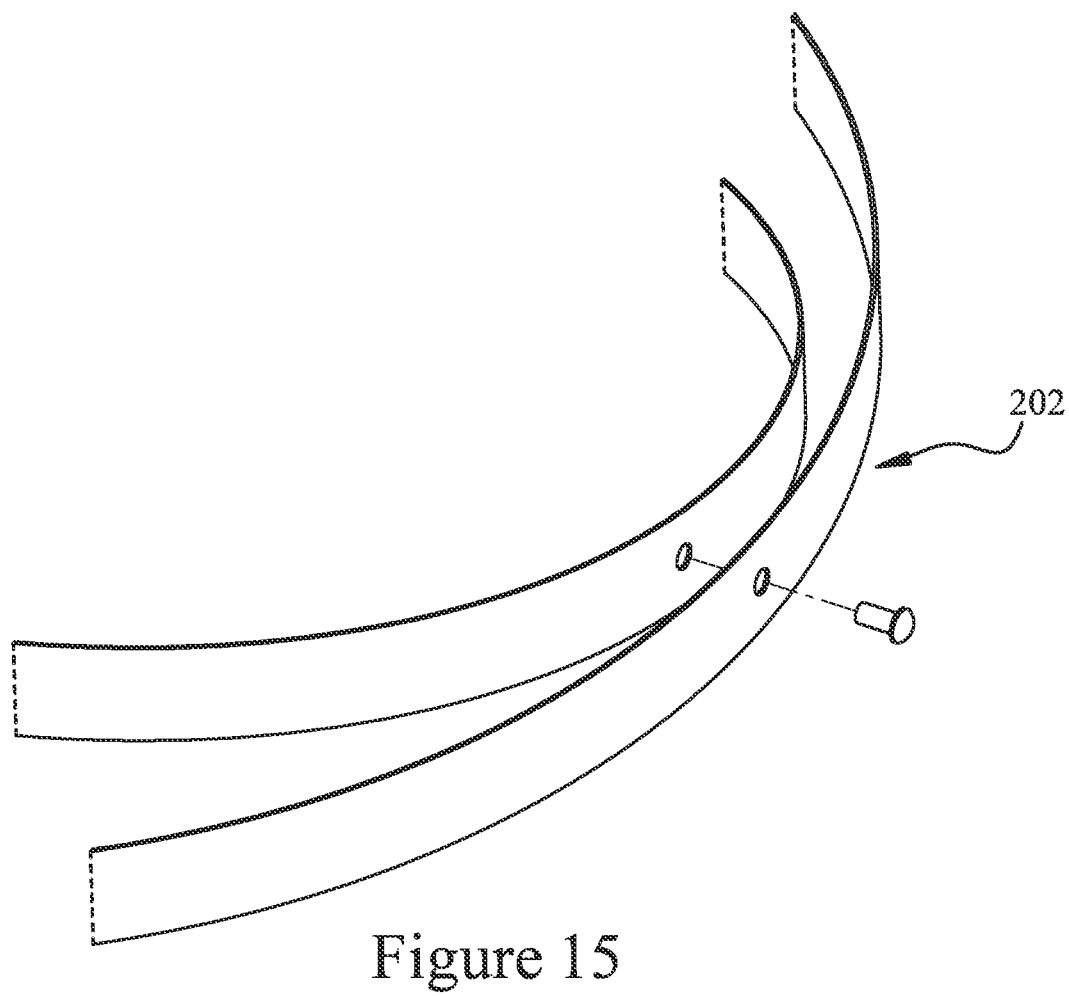
FIG. 15 shows an exploded view of two lattice strips secured by a fastener.
Figure 16:
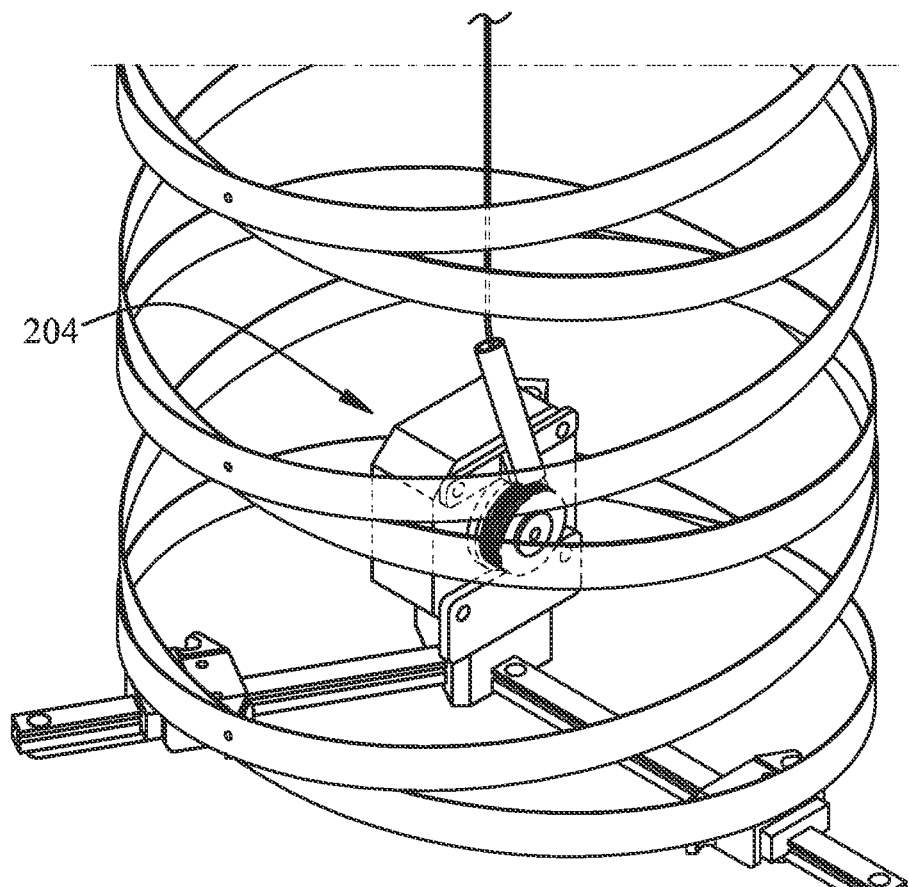
FIG. 16 shows a tension element controlled by a motor deployment mechanism within a deployed lattice structure.
Figure 17:
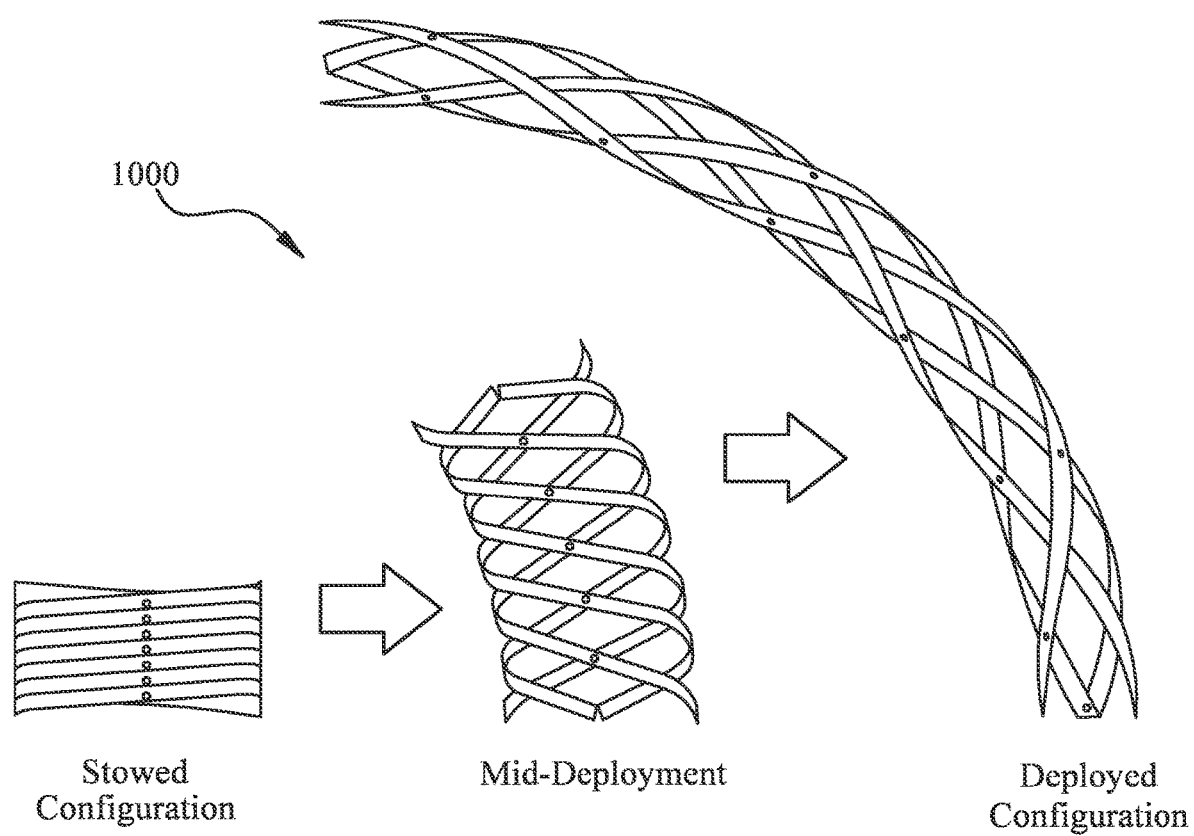
FIG. 17 shows the changing radius of curvature along a length of the lattice and the change in fastener spacing during deployment of the lattice structure.

FIG. 13a shows an application of the deployable structure with variable curvature 1100. The deployable structure 1000 may be used, for example, for steering in a hydrofoil catamaran. FIG. 13b shows another application of the deployable structure with variable curvature 1000. The deployable structure 1000 may be used, for example, as an artificial elbow joint. However, the uses the deployable structure 1000 are not limited thereto. FIG. 13c shows another application of the deployable structure with variable curvature 1000. The deployable structure 1000 may be used, for example, as a deployable robotic arm on spacecraft. However, the uses the deployable structure 1000 are not limited to such example applications.

Although the exemplary embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A deployable structure comprising:
   a lattice element arrangeable in a stowed configuration and a deployed configuration, the lattice element comprising:
   a pre-stressed strip arranged in a clockwise helix;
   a pre-stressed strip arranged in an anticlockwise helix, wherein the pre-stressed strips are pre-stressed by bending from a large radius on manufacture to a smaller radius when incorporated into the lattice element; and
   a plurality of fasteners for rotatably coupling the strips to one another at a plurality of positions distributed along the length of the strips;
   characterised in that the fasteners are provided at unequal spacings along the length of the strips such that on deployment the lattice element bends to a curved deployed configuration.

2. The deployable structure of claim 1, wherein the fasteners are provided at unequal spacings along a part of the length of the strips such that on deployment the lattice element bends to a curved deployed configuration along a part of the length thereof, and are further provided at equal spacings along a part of the length of the strips such that on deployment the lattice element bends to a rectilinear deployed configuration along a part of the length thereof.

3. The deployable structure of claim 1, wherein the fasteners are provided at generally decreasing spacings along a part of the length of the strips such that on deployment the lattice element bends to a curved deployed configuration along a part of the length thereof with a decreasing radius of curvature.

4. The deployable structure of claim 1, wherein the fasteners are provided at generally increasing spacings along a part of the length of the strips such that on deployment the lattice element bends to a curved deployed configuration along a part of the length thereof with an increasing radius of curvature.

5. The deployable structure of claim 1, wherein the lattice element comprises:
   a plurality of pre-stressed strips arranged in a clockwise helix; and
   a plurality of pre-stressed strips arranged in an anticlockwise helix.

6. The deployable structure of claim 1, wherein the strips comprise a plurality of holes that align with one another and at which the fasteners are provided, passing through holes in the strips and holding the strips adjacent to one another.

7. The deployable structure of claim 1, wherein the pre-stressed strips comprise a fibre reinforced polymer material.

8. The deployable structure of claim 1, wherein the lattice element is generally cylindrical in the stowed configuration.

9. The deployable structure of claim 1, wherein deployment takes place using stored energy of bending in the pre-stressed strips.

10. The deployable structure of claim 1, wherein the deployable structure comprises a deployment mechanism comprising:
    a motor; and
    a tension element,
    wherein the deployment mechanism is arranged to regulate deployment of the lattice element using the tension element.

11. The deployable structure of claim 10, wherein the deployment mechanism comprises a tension controller coupled to the tension element, the tension controller providing the motor, wherein the tension controller is arranged to control the tension on the tension element over the course of deployment from the stowed configuration to the deployed configuration to thereby regulate deployment of the lattice element.

12. The deployable structure of claim 1, further comprising a second lattice element connected in series with the first lattice element.

13. The deployable structure of claim 1 comprising a solar array or antenna coupled to the lattice element.

14. A method of manufacturing a lattice element for a deployable structure as set out in claim 1, the method comprising:
    determining required lattice element characteristics;
    forming strips for the lattice element such that the strips have a large radius; and
    assembling the strips into the lattice element by bending the strips from the large radius to a smaller radius, thereby pre-stressing the strips on incorporation into the lattice element.

* * * * *